(12) United States Patent
Haussler

(10) Patent No.: US 11,327,305 B2
(45) Date of Patent: May 10, 2022

(54) HEAD-UP DISPLAY

(71) Applicant: SEEREAL TECHNOLOGIES S.A., Munsbach (LU)

(72) Inventor: Ralf Haussler, Dresden Sachsen (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 16/770,689

(22) PCT Filed: Dec. 5, 2018

(86) PCT No.: PCT/EP2018/083609
§ 371 (c)(1),
(2) Date: Jun. 8, 2020

(87) PCT Pub. No.: WO2019/110647
PCT Pub. Date: Jun. 13, 2019

(65) Prior Publication Data
US 2021/0165215 A1    Jun. 3, 2021

(30) Foreign Application Priority Data

Dec. 7, 2017 (EP) .................................... 17205794

(51) Int. Cl.
G02B 27/01  (2006.01)

(52) U.S. Cl.
CPC .... *G02B 27/0101* (2013.01); *G02B 2027/011* (2013.01); *G02B 2027/0138* (2013.01)

(58) Field of Classification Search
CPC ...... G03B 21/008; G03B 21/28; G03B 21/58; G03B 21/208; G03B 21/2013; G03B 21/2033; G02B 27/01; G02B 27/0101; G02B 27/0103; G02B 2027/0105; G02B 2027/011; G02B 2027/0116; G02B 2027/0123; G02B 2027/0138
See application file for complete search history.

(56) References Cited

U.S. PATENT DOCUMENTS

| 5,138,469 A | 8/1992 | Wood et al. |
| 5,598,175 A | 1/1997 | Iino |
| 5,734,357 A | 3/1998 | Matsumoto |
| 7,839,548 B2 | 11/2010 | Schwerdtner |
| 9,001,282 B2 | 4/2015 | Archambeau et al. |

(Continued)

FOREIGN PATENT DOCUMENTS

| DE | 4445555 A1 | 6/1995 |
| DE | 102007001266 A1 | 7/2008 |

(Continued)

*Primary Examiner* — Sultan Chowdhury
(74) *Attorney, Agent, or Firm* — Saul Ewing Arnstein & Lehr LLP

(57) ABSTRACT

The invention relates to a head-up display device for representing information in a field of view of an observer. The head-up display device comprises at least one projection device, a deflection device which comprises at least one deflection element at which incident light beams are deflected, a sensor device, and a control device. The sensor device is used for detecting data of at least one test beam which is incident on the deflection device. The control device is used for determining at least one aberration caused by the deflection device and for determining at least one correction signal in real time.

32 Claims, 7 Drawing Sheets

(56) References Cited

U.S. PATENT DOCUMENTS

| | | | |
|---|---|---|---|
| 2007/0148472 A1* | 6/2007 | Masaki | B32B 17/10568 |
| | | | 428/426 |
| 2011/0157667 A1* | 6/2011 | Lacoste | G03H 1/2205 |
| | | | 359/9 |
| 2013/0176539 A1* | 7/2013 | Kilcher | H04N 13/363 |
| | | | 353/10 |
| 2013/0182302 A1* | 7/2013 | Shikii | H04N 9/3161 |
| | | | 359/13 |
| 2013/0265622 A1 | 10/2013 | Christmas et al. | |
| 2016/0117802 A1* | 4/2016 | Nakai | G06F 3/012 |
| | | | 345/633 |
| 2016/0163108 A1 | 6/2016 | Kim | |
| 2017/0359558 A1* | 12/2017 | Harada | H04N 9/3182 |
| 2018/0017790 A1* | 1/2018 | Kuzuhara | B60K 37/02 |
| 2018/0039078 A1* | 2/2018 | Cai | G02B 27/0101 |
| 2018/0046140 A1* | 2/2018 | Smithwick | G02B 26/106 |
| 2018/0074316 A1* | 3/2018 | Burkhardt | G02B 26/12 |
| 2021/0041687 A1* | 2/2021 | Yokota | G02B 26/101 |

FOREIGN PATENT DOCUMENTS

| | | | |
|---|---|---|---|
| EP | 1956413 | A2 | 8/2008 |
| WO | 2004044659 | A2 | 5/2004 |
| WO | 2005088610 | A2 | 9/2005 |
| WO | 2015173558 | A1 | 11/2015 |

* cited by examiner

HEAD-UP DISPLAY

CROSS REFERENCE TO RELATED APPLICATIONS

This application claims the priority of PCT/EP2018/083609, filed on Dec. 5, 2018, which claims priority to European Application No. EP 17205794.5, filed on Dec. 7, 2017, the entire contents of each of which are incorporated fully herein by reference.

BACKGROUND OF THE INVENTION

The present invention relates to a head-up display device for representing information in a field of view of an observer, in particular a head-up display device in which it is possible to compensate for aberrations in the optical beam path. Furthermore, the present invention also relates to a method for representing information in a field of view of an observer.

Projectors or projection devices are display devices with which two-dimensional information is generated and preferably imaged on a projection surface or a display screen.

However, projection devices may also be used to generate and display a virtual image. Such projection devices are, for example, used as head-up displays in vehicles in order to blend content or information into the real environment of the vehicle. The insertion or display or overlay of additional information with the natural perception or environment of a person is also referred to as augmented reality. This additional shown information, for example, about speed displays, temperature displays, signs, warnings, lane changes, or also of assistance functions, navigation system functions, or radio functions, is thus blended into the field of view or visual range of an operator of the vehicle, without the driving behavior or operating behavior of the operator thereby being impaired.

Such virtual information normally appears at a distance of approximately 2 m to 3 m from the user of the vehicle.

However, when observing the information, perception errors may occur which may occur when creating the information.

For example, US 2016/0163108 A1 discloses a head-up display which carries out a correction of perception errors using radar sensors or lidar sensors, where for this purpose, the eye position of a driver of a vehicle and the position of an object located outside the vehicle are determined by means of the sensors. Corresponding correction parameters are determined and external object information is shown in a corrected manner.

A head-up display is also described in US 2013/0265622 A1. The head-up display reconstructs a hologram as a virtual image at different depths or distances from an observer of the virtual image. This takes place by providing variable lens data when encoding the hologram, in addition to the image data. In this case, a pseudo-three-dimensional representation is generated by means of rapidly successive representations of two-dimensional reconstructions at different depths.

WO 2015/173558 A1 discloses a head-up display which comprises a diffusor for representing an image. In this case, the surface of the diffusor is formed in such a way that the distortion caused by the spatially differing curvature of the windshield of a vehicle is compensated for statically. The diffusor is thus directly adapted to the windshield or is usable only for a specific windshield. However, dynamic compensation for the distortion during the vehicle operation is not possible.

A generally known head-up display (HUD) according to prior art is schematically shown in FIG. 1 for describing the general functionality. Such a head-up display is, for example, used in a transportation means, for example, an automobile or an aircraft, in order to blend information into the field of view of an operator of the transportation means or the observer of the information. The head-up display comprises a projection unit P which comprises a light source, a light modulator, and imaging elements, for example, lenses. The light exiting the projection unit P and shown by the black arrow is reflected at a windshield W in the direction of a visibility region V. The visibility region V is positioned in the region of at least one eye of the observer. The correct positioning of the visibility region V with respect to the observer can be carried out via a corresponding device in the head-up display. The shown virtual information is blended into a volume which spans from the visibility region V to the windshield W and beyond. The windshield W is designed to be translucent, so that the observer can observe the shown information or the shown image blended into the surroundings.

Head-up displays are also known which provide a mirror element in the area of the windshield. The mirror element may be a normal mirror in which the angle of incidence and the angle of reflection are equal in magnitude. The mirror element may also contain a diffractive optical element (DOE) or a holographic optical element (HOE), in which the angle of incidence and the angle of reflection may differ from one another in magnitude. With such a DOE or HOE, more freedom of design of the optical beam path and the angle of incidence and angle of reflection of the light can be achieved.

However, during the operation of a head-up display, which may be arranged in a transportation means, mainly due to external influences, deformations of the windshield may occur, or when using a mirror element, deformation of the mirror element may also occur. Thus, such deformations of the mirror element also result in changes of its position or angle if the mirror element is attached to the windshield or is integrated directly into it. Such deformations of the windshield and/or the mirror element may, for example, occur due to thermal strain, air pressure due to the airstream, or also due to vibration of the transportation means.

Any deformations of the windshield and/or the mirror element used, and changes in its position or angle, may have also a disadvantageous effect on the optical beam path of the head-up display. As a result, deformations result in aberrations of the wavefront or light beam reflected by the windshield and/or the mirror element, whereby the information which is blended into the field of view of the driver is distorted. However, it may also occur that light is deflected in an incorrect direction due to the deformation of the windshield and/or the mirror element, and therefore, no light or only a portion of the light reaches the visibility region and thus the eyes of the driver after reflecting at the windshield and/or at the mirror element. The shown information would then not be visible or would no longer be completely visible.

However, deformations of the windshield and/or the mirror element and resulting changes in the position or angle of the mirror element would be particularly critical to observe if the head-up display is designed as a holographic head-up display which is based on the principle of subhologram encoding and a tracked visibility region or observer window. The principle of the subhologram encoding in connection with the tracking of the visibility region is, for example, disclosed in WO 2004/044659 A1, the disclosure content of which is to be incorporated here in its entirety. Here, the imaging of the light source of the projection unit used into the observer plane plays an important point in this principle. For this reason, the deformations of the windshield and/or the mirror element would result in aberrations in the imaging of the light source, and possibly in crosstalk of undiffracted light or other diffraction orders which arise through the use of essentially coherent light for generating the information, in the visibility region. Changes in the position or the angle of the mirror element also result in direction errors of the light in the beam path. Thus, it may occur that a visibility region is no longer positioned at an eye of the driver or the observer of the information.

The deformations of the windshield and/or the mirror element may also change during the operation of the transportation means, so that during the operation, different deformations may be present, which may considerably impair the perception of the information blended into the field of view of the observer.

The devices of the prior art, which already provide solutions for the aberration correction, where, however, this correction relates only to a specific deformation of the windshield and/or the mirror element, do not, however, solve the problem that different deformations of the windshield and/or the mirror element may be present during the operation of the head-up display, and that they must be corrected or compensated for in order to be able to provide this information to an observer of the information with high accuracy and high image quality.

SUMMARY OF THE INVENTION

It is therefore an object of the present invention to provide a head-up display device which makes it possible to respond to deformations of the windshield and/or a mirror element, and changes in its position or angle, and which can compensate for the thereby resulting at least one aberration in real time.

The present object is achieved according to the present invention by means of a head-up display device having the features of claim 1.

According to the present invention, a head-up display device is provided which, in addition to generating and displaying information in a field of view of an observer, is particularly suitable for compensating for aberrations such as distortion, coma, astigmatism, field curvature, and spherical or chromatic aberration. The head-up display device can generate the information to be shown or to be presented via conventional two-dimensional projection or also holographically. Furthermore, the information in the field of view could be displayed two-dimensionally or three-dimensionally. Such a head-up display device according to the present invention for representing information in a field of view of an observer comprises at least one projection device, a deflection device, a sensor device, and a control device. Incident light beams are deflected at the deflection device, which comprises at least one deflection element. The sensor device is used for detecting data of at least one test beam which is incident on the deflection device. The control device is used for determining at least one aberration caused by the deflection device and for determining at least one correction signal in real time.

In the case of the head-up display device according to the present invention, the deflection device, which comprises at least one deflection device which may be designed as a windshield of a transportation means or as a partially reflective element, for example, a mirror element, is illuminated with at least one test beam, in addition to the light which is deflected by the deflection device to an observer and which is referred to as signal beams. This test beam is reflected at the deflection device in the direction of the sensor device and is then detected by the sensor device. In this case, data of the at least one test beam are detected. By means of the detection of the wavefront, the position, and the direction of the at least one test beam, it is possible to calculate at least one aberration of the wavefront and at least one direction error of the light. Based on the data of the sensor device, thereafter, at least one aberration which is caused by means of deformations of the deflection device is determined and calculated by means of the control device. According to the present invention, the term "aberration" is also to be understood to mean direction errors or angle errors of the light. Based on the determined aberration(s), at least one correction signal is then determined. The determination of the aberration(s) and the at least one correction signal is provided in real time.

In this way, it is then possible to determine and also to compensate for at least one aberration which is caused by means of deformations of the windshield and/or the mirror element by means of external influences on these elements, in real time, i.e., during the use or during the operation of the head-up display device. As a result, the image quality of the information to be generated in the field of view of the observer can be considerably improved and increased. This in turn also has the enormous advantage that such a head-up display device according to the present invention can be used in any model of a transportation means. For example, the head-up display device according to the present invention could thus then be used in various models of a motor vehicle or also in different models of an aircraft, and the caused aberrations could be determined in real time and also compensated for in real time.

Further advantageous embodiments and refinements of the present invention may be found in the other dependent claims.

In a particularly advantageous embodiment of the present invention, it may be provided that at least one modulation device is provided, where the at least one modulation device is provided for the correction of signal beams which are directed in the direction of the observer with the at least one correction signal in real time.

The at least one aberration may be compensated for or corrected in at least one modulation device. For this purpose, by means of the control device, the at least one correction signal of the at least one modulation device, which can be designed to be controllable, is transmitted. The modulation device can be controlled in such a way that at least one signal beam originating at the at least one projection device, or several signal beams, are modulated according to the correction signal, so that the at least one aberration caused by the deflection device is corrected or compensated for. For this purpose, the modulation device is arranged in the optical beam path. For this purpose, the compensation for the at least one aberration may take place in real time.

In this way, the detection, the calculation, and the compensation for the at least one aberration may take place in real time and especially continuously, also in a feedback loop in which the at least one correction signal is checked and possibly corrected. Thus, it is possible for the aberration compensation, for example, to match the instantaneous deformations of the windshield and/or the mirror element.

In an alternative or additional advantageous embodiment of the present invention, it may be provided that the projection device is provided for correcting signal beams with the at least one correction signal in real time, where in the case of a hologram calculation of a hologram provided for the projection device, the at least one correction signal can be included.

The compensation for the at least one aberration may also take place in a hologram calculation. The hologram to be calculated is encoded into a spatial light modulation device which has the at least one projection device. This approach may in particular be advantageous if the head-up display device is designed as a holographic head-up display device and thus, a hologram is encoded into the spatial light modulation device, with which the information to be shown is generated in the field of view of an observer. This means that the at least one aberration can be compensated for in addition to the modulation device, or alternatively, also only in a hologram on the spatial light modulation device of the projection device. For this purpose, the at least one correction signal is transmitted to the projection device and included in the hologram calculation. In this way, the aberration(s) are made available in the hologram calculation and are directly compensated for in the projection device.

In a further advantageous embodiment of the present invention, the at least one deflection element of the deflection device may be designed as a windshield.

The signal beams as well as the at least one test beam are deflected at the air-glass boundary surface of the windshield under the condition that the light angle of incidence is equal to the light angle of reflection. In this case, care should be taken that the at least one test beam is not incident at the same position on the windshield at the same angle as the signal beams. As a result, it may be ensured that the at least one test beam is deflected in another direction than the signal beams.

Thus, the windshield of a transportation means is a part of the head-up display device. However, it does not form a fixed part, since the head-up display device is usable in different transportation means and thus demands or requires no specific type of windshield.

However, it is also possible that the at least one deflection element of the deflection device may be designed as a semi-transparent mirror element which is provided in the area of the windshield. However, this semi-transparent mirror element would then form a fixed part of the head-up display device.

Advantageously, it may be provided that the at least one deflection element of the deflection device is designed to be wavelength-selective and/or angle-selective.

The at least one deflection element essentially deflects only light of a certain wavelength and/or only light at a certain angle of incidence, and allows light of other wavelengths and/or at other angles of incidence to pass through without a deflection or only with a small, negligibly small portion having deflection. In this way, it may be ensured in a particularly advantageous manner that the at least one test beam is deflected by the at least one deflection element not in the direction of an observer, but in a different direction in which the detection of the test beam can be carried out without the influence on the signal beams and on the observer.

According to the present invention, the at least one deflection element may be designed as a volume grating or as a volume grating which is attached to a substrate. Volume gratings are wavelength-selective and angle-selective. This means that they essentially deflect only light of a defined wavelength and at a defined angle of incidence. Volume gratings have Bragg planes at which the light is reflected and selectively deflected. Volume gratings may, for example, be exposed in photopolymer by means of two-beam interference.

It is, for example, possible that the volume grating designed as a deflection element (here, it makes no difference whether the volume grating is attached to a substrate or not) is used to deflect or to direct the signal beams in the direction of the observer. However, the at least one test beam is not deflected at the volume grating, but at the air-glass interface of the windshield, and this under the condition that the light angle of incidence is equal to the light angle of reflection.

Conversely, it is of course also possible that the volume grating which is designed as a deflection element (here as well, it makes no difference whether the volume grating is attached to a substrate or not) may be used to deflect or direct the at least one test beam in a predetermined direction toward the sensor device. However, the signal beams are not deflected at the volume grating, but at the air-glass interface of the windshield, and this under the condition that the light angle of incidence is equal to the light angle of reflection.

Considered generally, the use of volume gratings enables great freedom of design with respect to the angle of incidence and the angle of reflection of the incident light beams. This is because for the volume grating, the fact holds true that the light angle of incidence and the light angle of reflection may be different, since it relates to diffraction gratings.

Furthermore, according to the present invention, it may be provided that the deflection device comprises at least two deflection elements.

Here, the at least two deflection elements may be designed as volume gratings. In this case, it may be provided that the signal beams are deflected only from one volume grating, where the at least one test beam is deflected only from the volume grating which does not deflect the signal beams. Thus, the at least one test beam is directed only to the sensor device, and the signal beams are directed only to the observer. For the ambient light of the head-up display device which is incident on the volume gratings through the windshield from outside the transportation means, the volume gratings are essentially transparent and do not result in a deflection of the ambient light.

The volume gratings may be attached to a substrate. They may be attached to the substrate in two separate layers, where it is also possible to provide the volume gratings in a common layer. These volume gratings may be exposed for this purpose in a photopolymer layer by multiplexing.

It is also possible that one of the at least two deflection elements may be designed as a volume grating, and the other of the at least two deflection elements may be designed as a mirror element.

It may also be advantageous if the at least one deflection element is designed as a layer stack having dielectric layers. The layer stack having dielectric layers could be designed in such a way that the signal beams are reflected, where the light angle of incidence and the light angle of reflection are again equal in magnitude. Such a layer stack may be wavelength-selective, whereby only the signal beams are reflected and deflected, and the at least one test beam is not. The at least one test beam could be deflected at the air-glass interface of the windshield. Of course, it is also conversely possible that the layer stack reflects only the at least one test beam and correspondingly deflects it to the sensor device, where the signal beams are not reflected and deflected by the layer stack. The signal beams could then, for example, be deflected at the air-glass interface of the windshield.

In an additional embodiment of the present invention, it may be provided that the projection device comprises an illumination device having at least one light source, at least one spatial light modulation device, and an optical system.

By means of this projection device, the information to be shown is generated for the observer. This may take place in a conventional manner. However, generation of the information could also take place holographically. For this purpose, a hologram is encoded into the spatial light modulation device which may be composed of individual subholograms. By means of the at least one light source which emits substantially coherent light, and an optical system, the information is then generated or reconstructed which is encoded as a hologram in the spatial light modulation device. For this, the at least one light source is imaged into the plane of the observer, where in this observer plane, a visibility region is generated. The visibility region may be generated by a Fourier transform of the hologram or by means of imaging of the spatial light modulation device. In addition, the visibility region is only a few millimeters in size and must be provided at the position of an eye of the observer, so that when the observer looks through this visibility region, said observer can observe the virtually generated information in the field of view outside the transportation means. In the case of movement of the eyes of the observer, and also in the case of movement of the observer, this visibility region can be tracked to the eye. In order to ensure this, it is necessary that the eye position is detected, for example, by a position detection system.

Advantageously, it may be provided that the projection device is provided both for emitting signal beams and for emitting at least one test beam. This is advantageous in this regard, since only one device is thus needed which emits both the signal beams and the at least one test beam. In this way, the head-up display device can be kept compact.

Furthermore, it may be advantageously provided that the at least one modulation device is arranged in the beam path between the at least one projection device and the deflection device, where the at least one modulation device comprises at least one modulation element which modulates incident signal beams corresponding to the at least one determined correction signal.

In this case, it may preferably be provided that the at least one modulation device is controllable by means of the control device, which transmits the at least one correction signal to the modulation device. The control device controls the at least one modulation device in such a way that the signal beams emitted by the projection device are modulated corresponding to the determined correction signal in order to compensate for or to correct the at least one aberration in the wavefront of the signal beams caused by the deflection device.

Here, particularly preferably, the at least one modulation device may be designed as a phase modulator which comprises liquid crystals, where the orientation of the liquid crystals is controllable by means of local electric fields. For compensating for the at least one aberration, a phase modulator may be provided, for example, as a modulation device. The phase modulator comprises a liquid crystal layer provided between two substrates, the orientation of the liquid crystals being controllable. The orientation of the liquid crystals can be changed by applying local electric fields. The phase modulator can be controlled in such a way that an orientation of the liquid crystals is achieved which is adjusted to the correction signal, whereby a modulation of the wavefronts of the signal beams corresponding to the correction signal is achieved. In other words, with such a phase modulator, it is possible in particular to modulate the phase and thus the wavefront of the incident light locally. In this way, the wavefronts of the signal beams which are incident on the at least one modulation device may be modulated corresponding to the aberration(s) to be corrected.

An alternative embodiment of the at least one modulation device may provide liquid crystal cells which modulate the light according to the electrowetting principle. The electrowetting principle is based on the change in the form of liquid cells. In this case, the surface tension of the liquid droplets is deformed by applying an electric field, so that the incident light can be correspondingly modulated.

It may be particularly preferable if the liquid crystals are provided in cells, where the liquid crystal cells are arranged rotationally symmetrically in the at least one modulation device. The at least one modulation device may have rotationally symmetrical or ring-shaped or circular arranged liquid crystal cells. This embodiment of the liquid crystals or liquid crystal cells is particularly well suited for correcting rotationally symmetrical aberrations, for example, the spherical aberration, also known as apertural defect.

Furthermore, it may be advantageous if the at least one modulation device is designed in a reflective fashion, preferably as a MEMS modulation device. An arrangement of micromirrors, in which it is possible to control the travel and tilt angle thereof locally, could be used to modulate a wavefront of at least one signal beam.

Of course, a known liquid crystal display may also be used as a modulation device.

In a further advantageous embodiment of the present invention, it may be provided that the sensor device is arranged outside the field of view of the observer. This is advantageous to the effect that as a result, the observer is not disturbed by the sensor device when observing the information in the field of view.

Furthermore, it may be advantageously provided that the sensor device is designed according to the principle of a Shack-Hartmann sensor or as a camera for the detection of the at least one test beam. The sensor device is provided to determine or to measure the wavefront and the direction of the at least one test beam. For this purpose, the sensor device may, for example, be designed as a wavefront sensor device according to the Shack-Hartmann principle, from the data of which aberrations and inclination angles of the wavefront of the test beam can be calculated. The sensor device could also be designed in another embodiment as a camera, in particular a camera having a camera chip, which detects the position and size of the at least one incident test beam and calculates the wavefront and direction of incidence of the test beam from it.

However, the sensor device could also be provided for measuring thermal and/or mechanical stresses of the deflection device. The sensor device then measures the temperature and/or mechanical tensions of the deflection device. By a calculation by means of a value table or data sets, the control device then determines at least one instantaneous value of at least one aberration of the deflection device from the determined measured values.

Furthermore, it is also possible that a light pattern projection system may be provided for generating a light pattern on or in the region of the deflection device.

The light pattern projection system generates a striped pattern or a grid pattern on the deflection device. In other words, by means of the light pattern projection system, a light pattern in the form of stripes or a grid is projected onto the deflection device. A camera system or a camera then records the shape of the light pattern, i.e., the stripe or the grid, and the control device calculates at least one aberration of the deflection device from the deviation of the shape from a required shape of the light pattern.

Alternatively, or in addition to a sensor device, markers may be provided on the deflection device for determining aberrations caused by the deflection device, the positions of which are determinable by means of a camera.

On the deflection device, for example, markers may also be provided by which caused aberrations may be determined. For this purpose, the individual positions of the markers are determined by a camera system. From the deviation of the individual position of the markers from previously defined required positions of the markers, at least one aberration of the deflection device may be determined and calculated.

In a further embodiment of the present invention, it may be provided that the at least one test beam has a wavelength which is different from that of the signal beams.

This is in particular advantageous if the deflection device comprises at least two volume gratings. It could then be provided that, for example, the at least one test beam is deflected only from one of the two volume gratings, where the signal beams are deflected from the other volume grating which does not deflect the at least one test beam. If a colored representation of the information is provided, then a volume grating should be provided for each color of the signal beams. The volume gratings may respectively be exposed in a layer. It is also possible that the volume gratings are exposed by multiplexing in a single layer.

For example, it may preferably be provided that the at least one test beam has a wavelength in the infrared wavelength range, and the signal beams respectively have a wavelength in the visible wavelength range. In this way, the at least one test beam may be directed to the sensor device, and the signal beams may be directed to the observer.

Advantageously, it may furthermore be provided that a further projection device is provided which is designed as a test projection device and which is provided for emitting the at least one test beam.

In this way, it is possible that the at least one test beam is not emitted by the projection device which also emits the signal beams, but by a further projection device which functions as a test projection device and emits only the at least one test beam. This test projection device is thus independent of the projection device emitting the signal beams and can be designed in a simple manner, since it must emit only the at least one test beam. This means that the at least one test beam is generated in a separate projection device, and the projection device could thus be designed for emitting signal beams more cost-efficiently and using simpler means than if the projection device, in addition to signal beams, also had to emit the at least one test beam.

This could also be advantageous in this regard, since, by means of different angles of incidence of the at least one test beam and the at least one signal beam or signal beams on the deflection device, it is possible in a simpler manner to deflect these light beams in different directions by means of the deflection device.

In a further embodiment of the present invention, it may be provided that a further modulation device is provided which is arranged in the beam path between the further projection device and the deflection device. This further modulation device may advantageously be provided for checking the compensation of the at least one aberration caused by the deflection device. After determining the at least one aberration and determining at least one correction signal by means of the control device, the correction signal may first be transmitted to the further modulation device, before the signal beams are modulated with the correction signal. The further modulation device then modulates a further test beam with the correction signal. This modulated test beam is in turn incident on the deflection device and is again deflected in the direction of the sensor device. The sensor device detects data of this test beam, and the control device determines whether or not at least one aberration in the wavefront of the test beam is still present. If aberration(s) are no longer present, the determined correction signal is transmitted to the at least one modulation device which is connected to the projection device for emitting signal beams, so that the at least one signal beam can be modulated with the at least one correction signal.

After this check and the determination of aberrations by means of the control device, if at least one aberration should still be present, then the at least one correction signal is again determined and calculated corresponding to the aberration which is still present. This correction signal could then again be transmitted for checking to the further modulation device which is connected to the test projection device, if, for example, the at least one aberration were to have a value which is still too high. If the value for the re-determined aberration is negligibly small, the at least one correction signal of the at least one modulation device may be transmitted for modulation with the signal beams. This approach for checking can likewise take place in real time.

Advantageously, a virtual visibility region may be provided in an observer plane in which an eye of an observer is situated, by which the represented information is observable in the field of view.

In an observer plane, a virtual visibility region may be generated if the information to be represented is holographically generated. This virtual visibility region may have a size smaller than the eye pupil of an observer or also larger than the eye pupil, or a size similar to the size of the eye pupil of an observer, for example, in a horizontal range from approximately 2 mm to approximately 15 mm. The vertical range of the visibility region may be between approximately 2 mm to approximately 10 mm. If the information is not generated holographically, but stereoscopically or purely two-dimensionally, the visibility region is then formed as a type of "eyebox" which can have a size of approximately 200 mm×approximately 100 mm.

The head-up display device according to the present invention may preferably be designed as a holographic head-up display device in which the information to be represented can be holographically generated.

The object according to the present invention is furthermore achieved by a method for representing information in a field of view of an observer according to the claims.

The method according to the present invention for representing information in a field of view of an observer comprises at least one projection device, a deflection device which can comprise at least one deflection element, a sensor device, and a control device. Data of at least one test beam exiting the at least one projection device and being incident on the deflection device are detected by means of the sensor device. At least one aberration caused by the deflection device is determined by means of the control device, where at least one correction signal is determined from it in real time. Light beams to be directed in the direction of the observer are modulated with the at least one correction signal, are then incident on the deflection device, and are directed as signal beams in the direction of the observer.

Advantageously, the at least one correction signal can be added to each signal beam emitted by the projection device by at least one modulation device, and the signal beam can be modulated in real time corresponding to a requested signal beam and directed to the observer by the deflection device. The at least one correction signal could alternatively or additionally be taken into consideration during the hologram calculation and included there in the calculation.

Using an eye position sensor system, the eye position of the observer in the observer plane may be detected in a particularly advantageous manner, where at least one aberration of the deflection device is determined by means of the control device, and at least one correction signal is determined from it in real time for the eye position of the observer.

There are now various possibilities for advantageously developing the teaching of the present invention and/or for combining the described exemplary embodiments or designs. For this purpose, on the one hand, reference is to be made to the patent claims subordinated to the independent patent claims, and on the other hand, to the following description of the preferred exemplary embodiments of the present invention, based on the drawings, in which preferred embodiments of the teaching are also generally described. The present invention will be described in principle based on described exemplary embodiments, but should not be limited to them.

DETAILED DESCRIPTION OF THE INVENTION

Figure 1:
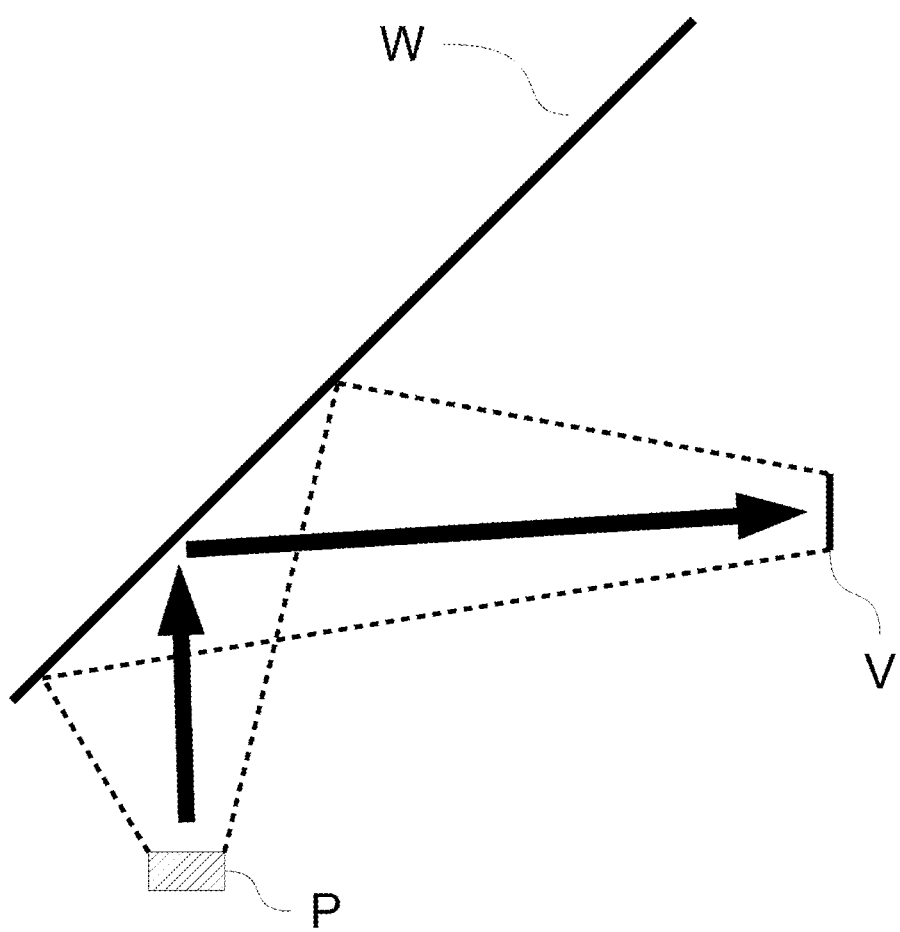
FIG. 1: a schematic drawing of a head-up display according to the prior art.

It should be briefly mentioned that same elements/construction elements/components also have the same reference numerals in the figures.

Head-up display devices are used in motor vehicles or aircraft in order to project information to the operator or vehicle driver directly into the field of view in the form of image information.

Figure 2A:
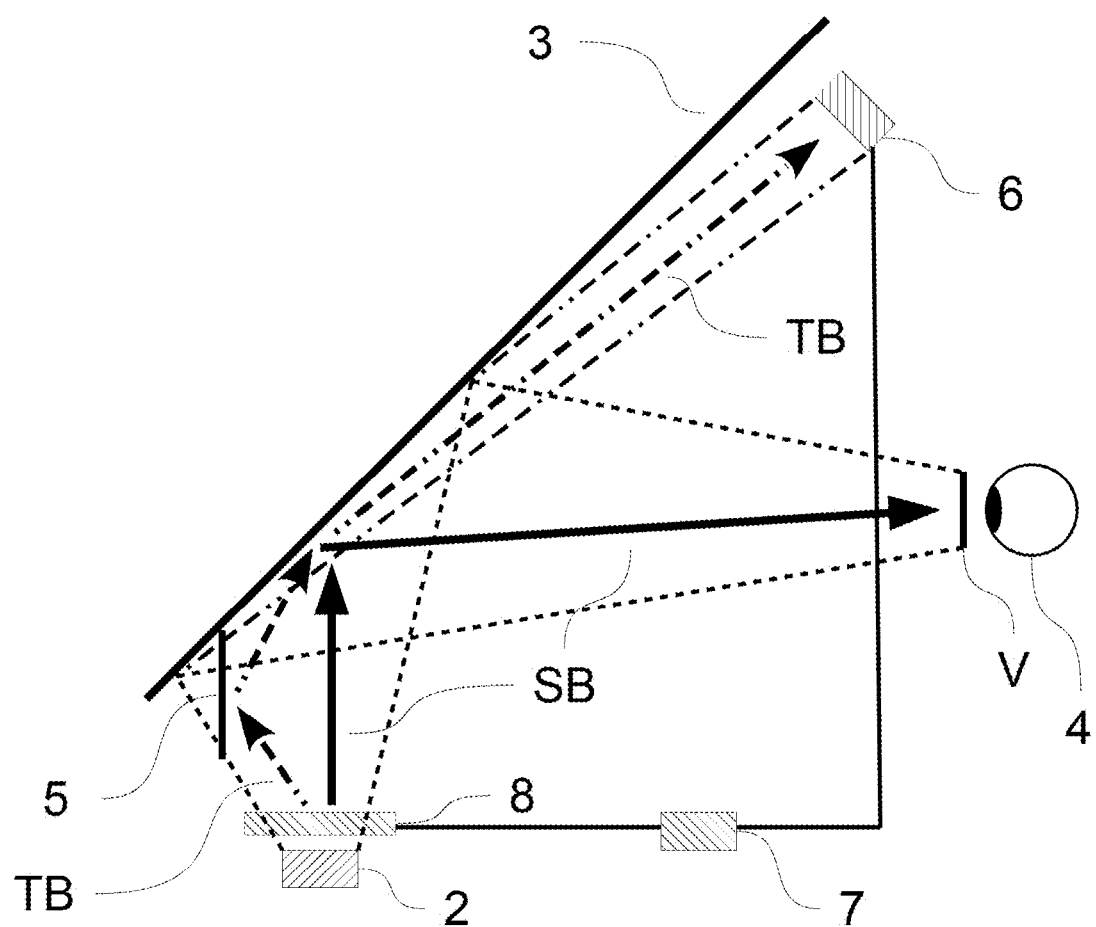
FIG. 2a: a schematic drawing of a head-up display device according to the present invention.

FIG. 2a shows one embodiment of the head-up display device according to the present invention. The head-up display device, which is provided in the interior of a motor vehicle or an aircraft and projects light, comprises a projection device 2 which comprises an illumination device having at least one light source and at least one spatial light modulation device, and an optical system. The optical system is not shown in greater detail here for reasons of clarity. The spatial light modulation device modulates the light emitted by the light source corresponding to information to be generated, which is displayed on the spatial light modulation device. The light emitted by the projection device 2 is projected onto a deflection device 3 which acts as a projection surface, so that the image of the spatial light modulation device is represented as virtual information to an observer 4 who is situated in the motor vehicle or in the aircraft, and is to be shown here by an eye. The deflection device 3 comprises at least one deflection element and here, is an integral part of the optical system of the head-up display device and is partially reflective. The information can be generated two-dimensionally in a known manner and represented in the field of view of the observer 4. The at least one deflection element of the deflection device 3 is designed in FIG. 2a as a windshield of the motor vehicle or aircraft.

However, in the spatial light modulation device of the projection device, a hologram may also be encoded in order to generate the information to be represented holographically. However, the at least one light source of the illumination device should then emit sufficient coherent light, for example, from a laser or an LED (light emitting diode) light source, in order to modulate the amplitude and phase of the incident light by means of the hologram encoded into the spatial light modulation device in such a way that the required information can be holographically generated in the field of view of the observer 4. The information can thus be generated and displayed two-dimensionally or three-dimensionally.

By the head-up display device according to the present invention, aberrations caused by the deflection device 3, which the light beams originating at the deflection device will have, can be compensated for or corrected in real time. For this purpose, the projection device 2 generates at least one test beam TB which has the same properties as a light beam which is to carry the information to be represented as a signal beam SB, and which is also generated by the projection device 2. By means of the test beam TB, at least one aberration is detected or determined which is caused by the deflection device 3 due to external or internal influences, for example, temperature fluctuations, pressure, vibrations, or the like. For this purpose, the test beam TB in FIG. 2a is guided to a reflection system 5 which deflects the test beam in the direction of the deflection device 3 and impinges on it there. The test beam TB then receives or carries the aberration(s) present in this region and is directed from the deflection device 3 in the direction of a sensor device 6. In order to measure the aberration correctly, it is important that the test beam is also incident at the position on the deflection device 3 at which the signal beam SB carrying the information is also to be incident on the deflection device 3. Only in this way the signal beam can be corrected when required with a correctly determined correction signal, so that the information can be represented without error. As is apparent from FIG. 2a, the test beam TB is reflected at the deflection device 3 at a different angle than that of the signal beam SB, so that it can be directed to the sensor device 6 and not deflected like the signal beam(s) SB in the direction of the observer 4. The dashed lines shown in FIG. 2a respectively as edge rays to the test beam TB are to illustrate that the test beam is fully incident on the sensor device 6. The sensor device 6 is provided outside the field of view of the observer 4 and may, for example, be attached to the roof of a motor vehicle, for example, of an automobile or an aircraft cockpit. The sensor device 6 detects and measures the incident wavefront and the direction of the test beam TB. The sensor device 6 may, for example, be a wavefront sensor device according to the Shack-Hartmann principle, from the data of which aberrations and inclination angles of the incident wavefront of a test beam can be calculated. In a further embodiment of the sensor device 6, said device may be designed as a camera which has a camera chip, where the camera chip detects the position and size of the incident test beam and calculates the wavefront and direction of incidence of the test beam from it.

By means of the data of the test beam TB detected in this way, in a control device 7, the at least one aberration of the wavefront of the test beam, which is determined by means of the test beam and in which directional errors of the light are also to be included, is then determined and calculated. As already mentioned, the aberration may be formed by means of deformations of the deflection device 3 and by means of changes in its position or angle relative to the projection device 2. In addition, the control device 7 determines at least one correction signal, also in real time, by which the signal beam carrying the information to be represented for the observer can be modulated in order to represent the information without aberrations.

The head-up display device furthermore comprises a modulation device 8 which is coupled with the control device 7 or is connected to it. The modulation device 8 is arranged after the projection device 2 in the beam path in the light propagation direction. The control device 7 transmits the determined at least one correction signal to the modulation device 8. In addition, the control device 7 subsequently controls the modulation device 8 in such a way that the wavefront(s) of the signal beam(s) also emitted by the projection device 2, which carry the information for the observer, are modulated with the at least one correction signal in such a way that the aberration(s) of the wavefront and the directional errors of the light of the signal beam included therein are compensated for. The modulation device 8 may comprise at least one modulation element for modulating the at least one signal beam SB.

The modulation device 8 may, for example, be designed as a phase modulator. The phase modulator may have liquid crystals, the orientation of which can be controlled by local electric fields. Therefore, the phase and thus the wavefront of at least one signal beam and at least one test beam can be locally modulated. In another embodiment of the modulation device 8, said device may comprise cells which modulate the light according to the electrowetting principle. The modulation device 8 could also be designed in a reflective fashion, for example, by means of a matrix of micromirrors of which the angle and travel are locally controlled. In other words, the modulation device 8 could be designed as a MEMS (microelectromechanical system) device, where by setting the angle and/or travel of the mirror elements, the phase and/or amplitude of the wavefront of the light or the signal beam can be modulated.

After the at least one aberration caused by the deflection device 3 has been determined and calculated in this way, i.e., by means of the at least one test beam, and a corresponding correction signal has been determined, the projection device 2 can emit at least one signal beam SB which is modulated with the information to be represented. This modulated signal beam SB is then incident on the modulation device 8 and is modulated, if required, with the at least one correction signal, in order to compensate for the aberration(s) caused by the deflection device. This modulated and corrected signal beam SB is then incident on the deflection device 3 at an angle range which is shown by the dashed lines, as is apparent from FIG. 2a. Here, a reflective optical system may also be provided in the head-up display device, which directs the signal beam under folding to the deflection device 3, whereby the size of the head-up display device may be designed in a more compact fashion. Such a reflective optical system is not illustrated here in the shown FIGS. 2a to 4 for reasons of clarity. The signal beam SB is then reflected at the deflection device 3 and reflected to an observer 4, and a visibility region V is generated there, within which the observer 4 can perceive the information. The projection device 2, in connection with the optical system, thus generates a virtual image which is perceived by the observer 4 through the visibility region V. The visibility region V is positioned in the region of at least one eye of the observer 4. From this region, which may be approximately 200 mm×150 mm, the observer 4 can observe the represented information in said observer's field of view, for example, just above the hood of a motor vehicle.

A visibility region V is also generated in a holographic head-up display device which may also be designed according to FIG. 2a. However, this visibility region V is then formed by a Fourier transform of the hologram encoded in the spatial light modulation device and may have a size from approximately 2 mm to 15 mm. Since this visibility region only has a limited size, it can be tracked to the new position of the observer in the case of movement of the observer.

Figure 3:
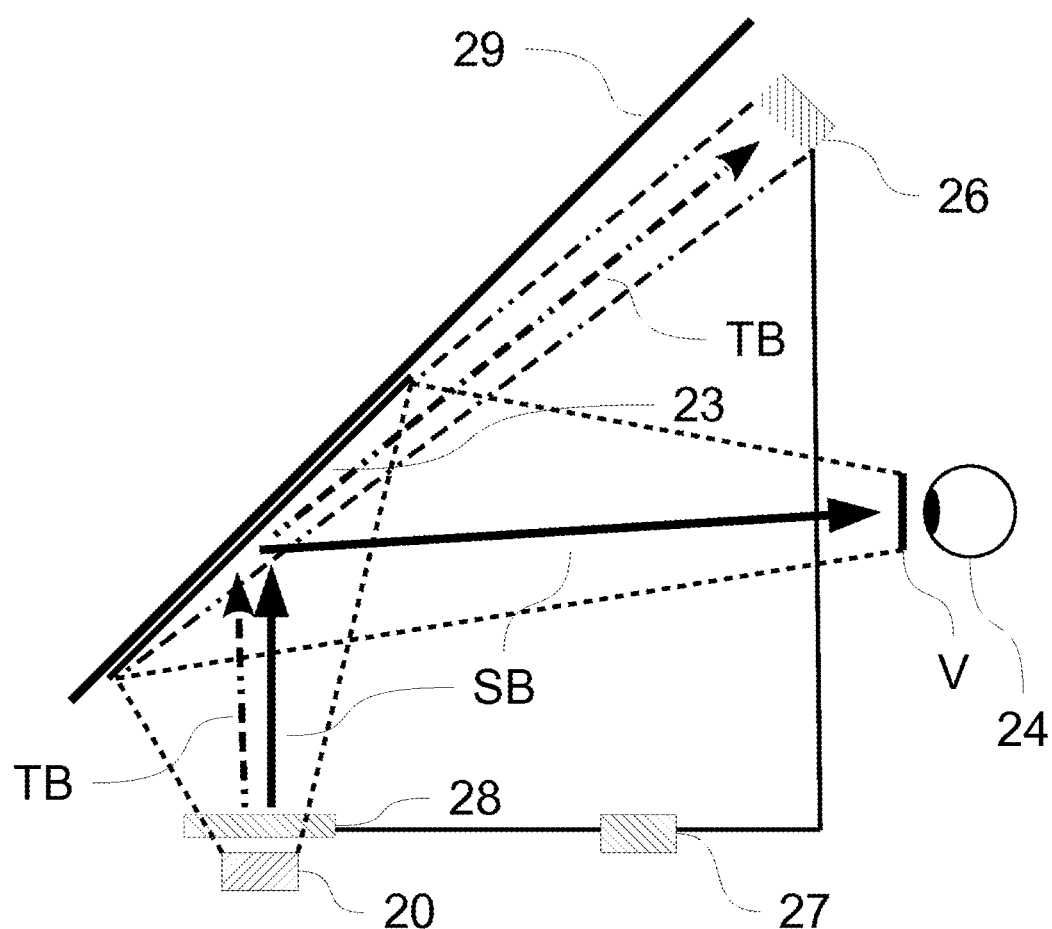
FIG. 3: a schematic drawing of a second embodiment of the head-up display device according to the present invention.

FIG. 3 shows another exemplary embodiment of the head-up display device according to the present invention. In terms of structure, this head-up display device corresponds to the head-up display device according to FIG. 2a. However, there is a major difference with respect to the head-up display device according to FIG. 2a. In the head-up display device according to FIG. 3, the windshield 29 is no longer an essential integral part of the optical system and therefore no longer generally acts as a deflection element of the deflection device as in FIG. 2a. Rather, a deflection device 23 is now provided which is arranged in the area of the windshield 29. Preferably, the deflection device 23 is attached directly to the windshield 29 of a vehicle or transportation means. In certain cases, the deflection device 23 may even be at least partially integrated into the windshield 29 in order to achieve a space-saving and stable arrangement.

In FIG. 3 as well, a projection device 20 again emits at least one test beam TB and at least one signal beam SB. However, the test beam TB is not reflected from the windshield 29 as a deflection device as in FIG. 2a, but from the deflection device 23 as a separate component of the head-up display device. The test beam TB is directed in the direction of a sensor device 26 which detects the at least one aberration caused by the deflection device 23 and determines data. This sensor device 26 is also not arranged in the field of view of an observer 24 observing the information to be represented. A control device 27 then determines and calculates the at least one aberration of the test beam TB and determines at least one correction signal. The determined correction signal is transmitted from the control device 27 to a modulation device 28, so that said modulation device modulates at least one signal beam SB emitted by the projection device 20 by means of the correction signal and thus correspondingly corrects the wavefront of the signal beam SB. The detection of the test beam TB, the determination of the at least one aberration, the determination of the at least one correction signal, and the compensation for the at least one aberration take place according to the procedure as described for FIG. 2a.

The at least one signal beam SB emitted by the projection device 20 is directed to the deflection device 23 after the compensation for the at least one aberration by the modulation device 28 and is reflected by said deflection device to a visibility region V. Here as well, the visibility region V is positioned at at least one eye of an observer.

Figure 4:
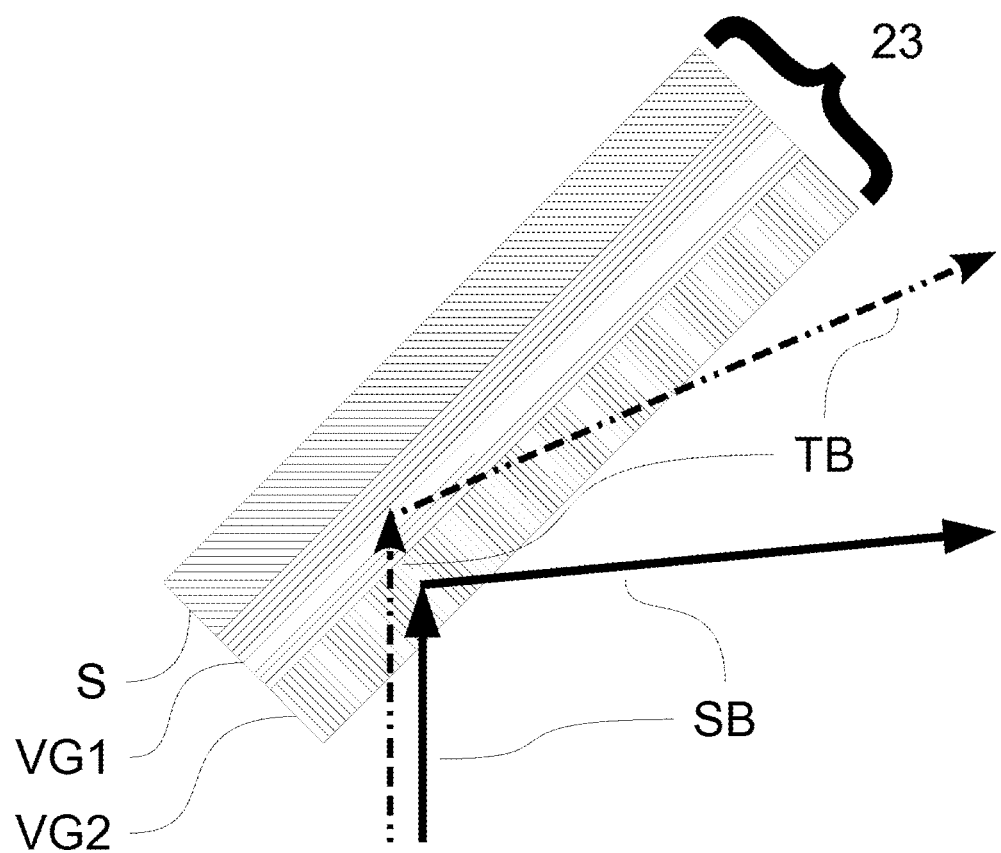
FIG. 4: a schematic drawing of a third embodiment of the head-up display device according to the present invention.

According to FIG. 3, in order for the at least one test beam TB, which, like the at least one signal beam SB, is also emitted by the projection device 20, not to be deflected by means of the deflection device 23 in the direction of the observer, but rather to be directed in the direction of the sensor device 26, the deflection device 23 should be correspondingly designed. FIG. 4 shows a possible exemplary embodiment of the deflection device 23. The deflection device 23 is partially reflective and comprises at least one deflection element. The deflection element of the deflection device 23 comprises a substrate S and two volume gratings VG1 and VG2 which are attached to it. Volume gratings have Bragg planes at which the incident light is reflected. They may, for example, be exposed in photopolymer by means of dual-beam interference. Photorefractive glasses or specially doped plastics, for example, PMMA-based plastics as described in Y. Gritsai et al. "Dye-doped PQ-PMMA phase holographic materials for DFB lasing", Journal of Optics, Volume 16, can also be used as layers in which volume gratings can be exposed. Since volume gratings are wavelength-selective and angle-selective, they essentially deflect only light of a certain wavelength and at a certain angle of incidence, and allow light of other wavelengths and/or another angle of incidence to pass without deflection. In other words, this means that light of a certain wavelength can be diffracted at a certain angle. In order to be able to use the deflection device for different wavelengths, i.e., for example, for a color representation of the information, a respective grating may be written into the same layer for different wavelengths. For example, for a blue, a red, and a green wavelength, one respective volume grating may be written into a layer. Each volume grating may be written in for the same angle of incidence and the same angle of diffraction, so that light of these wavelengths, for which the volume grating is then designed, is diffracted in the same direction. Alternatively, the Bragg planes may also be exposed in a common photopolymer layer for the different wavelengths.

In the shown exemplary embodiment according to FIG. 4, in which the deflection device comprises two deflection elements in the form of two volume gratings VG1 and VG2, the test beam TB is deflected only from the volume grating VG1 and the signal beam SB is deflected only from the volume grating VG2. This may be achieved in that the test beam TB has a different wavelength than that of the signal beam SB. For example, the test beam TB may have a wavelength in the infrared spectral range or may be emitted at a wavelength in the infrared spectral range, while the signal beam SB has a wavelength in the visible spectral range or is emitted at a wavelength in the visible spectral range. In this way, it is possible by the deflection device 23 to deflect the test beam TB to the sensor device 26 and to deflect the signal beam SB to the visibility region V. For the ambient light which is incident through the windshield 29 into the interior of the vehicle, the volume gratings VG1 and VG2 are essentially transparent and do not result in a deflection of the ambient light. In another embodiment, the volume gratings VG1 and VG2 may also be attached directly to the windshield 29 or integrated into it without a substrate S.

Further embodiments of the deflection device are possible. For example, instead of the volume grating VG2 in FIG. 4, a layer stack having dielectric layers may also be used, which reflects the signal beam SB. The angle of incidence and the angle of reflection of the signal beam are equal in magnitude. Such a dielectric layer stack may be wavelength-selective, whereby only the signal beam SB is reflected and the test beam TB is not. Of course, such a design is also conversely possible, i.e., instead of the volume grating VG1, a dielectric layer stack is used which reflects the test beam TB and does not reflect the signal beam SB.

As already mentioned, the two volume gratings VG1 and VG2 may be exposed in a single layer. The two volume gratings VG1 and VG do not have to be attached to the substrate S in separate layers.

They may also be attached in a common layer to the substrate, for example, by multiplexing in a photopolymer layer.

The two volume gratings VG1 and VG2 enable a high degree of freedom of design of the deflection device. For the volume gratings VG1 and VG2, it is true in each case that the angle of incidence and the angle of reflection of the light can be different, since it relates to diffraction gratings instead of mirror elements.

It is also possible to use a conventional mirror element as a deflection element in the deflection device instead of a volume grating VG1 and/or a volume grating VG2. Instead of diffraction at volume gratings, the reflection at the air-glass interface of the windshield of the vehicle is used. For example, the volume grating VG1 could be omitted, where instead, the test beam is used at the air-glass interface of the windshield of the vehicle under the condition that the light angle of incidence is equal to the light angle of reflection. However, it is also possible to dispense with the volume grating VG2, where instead, the signal beam is used at the air-glass interface of the windshield of the vehicle under the condition that the light angle of incidence is equal to the light angle of reflection.

Furthermore, it is also possible to use no volume gratings as deflection elements in the deflection device. Instead, the test beam and the signal beam are used at the air-glass interface of the windshield of the vehicle under the condition that the light angle of incidence is equal to the light angle of reflection. In this case, however, a further projection device should be provided which emits the at least one test beam and which is provided at another position than the projection device for the at least one signal beam in the head-up display device, so that the test beam is reflected or deflected to the sensor device, and the signal beam is reflected or deflected to the visibility region.

Figure 5:
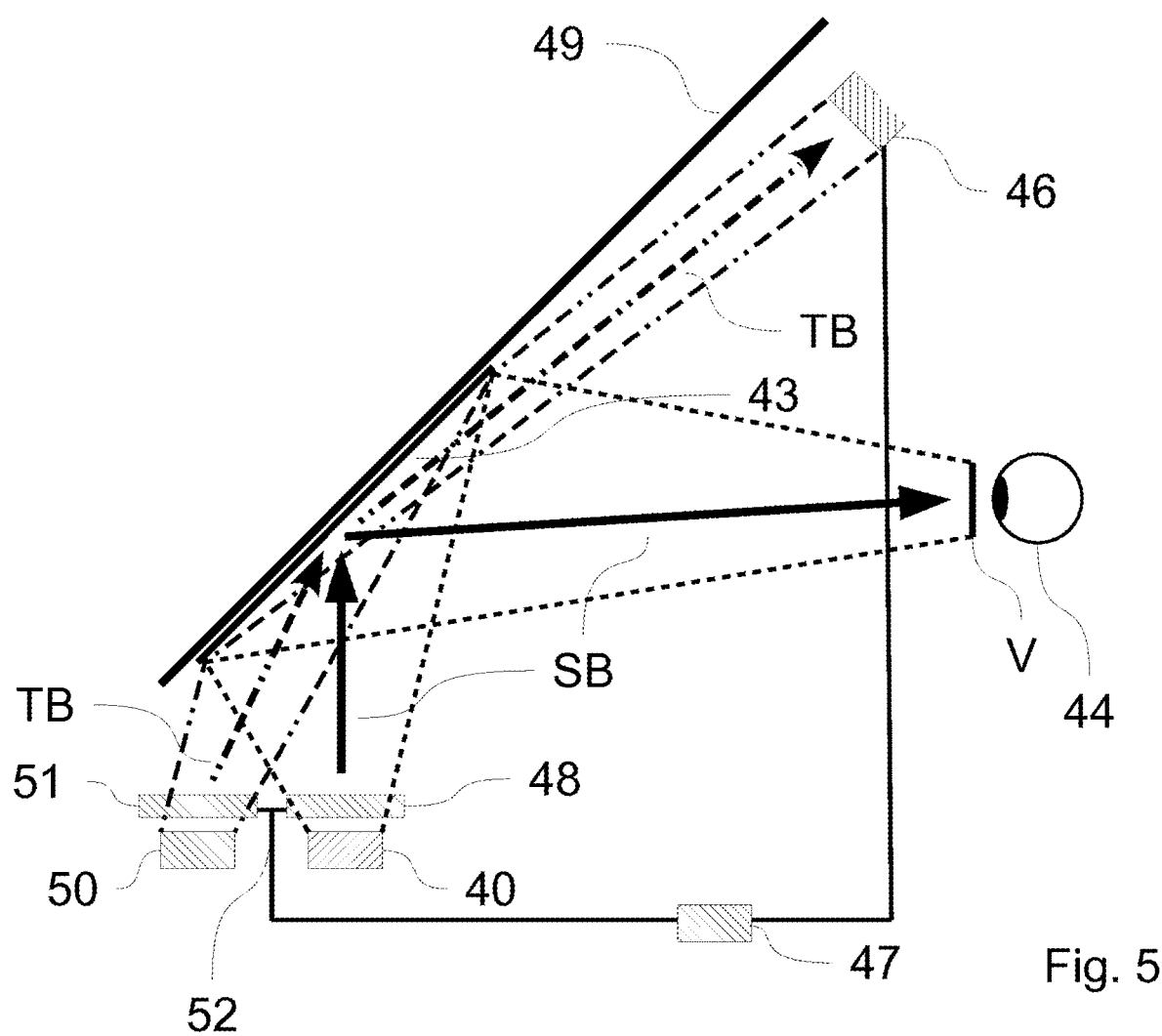
FIG. 5: a schematic drawing of a deflection device according to the present invention.

Such a head-up display device which comprises two projection devices for the decoupled emission of at least one test beam and at least one signal beam is shown in FIG. 5. There, two projection devices 40 and 50 are shown. As described in FIGS. 2*a* and 3, the projection device 40 emits at least one signal beam which is modulated with the information to be represented. On the other hand, the projection device 50 emits at least one test beam and is therefore designed as a test projection device and is referred to as such below. A deflection device 43 is also provided in FIG. 5 which is arranged in the region of the windshield 49. Preferably, this deflection device 43 may also be directly attached to the windshield 49 of a vehicle or transportation means. Here as well, in certain cases, the deflection device 43 may be integrated at least partially into the windshield 49 in order to achieve a space-saving and stable arrangement.

The test projection device 50 emits at least one test beam TB for determining at least one aberration caused by the deflection device 43, and directs said test beam to the deflection device 43. This test beam TB is then deflected from the deflection device 43, also designed in FIG. 5 as a separate component of the head-up display device, in the direction of a sensor device 46 which detects at least one caused aberration and determines data therefrom. Here as well, the sensor device 46 is not arranged in the field of view of an observer 44 observing the information to be represented. A control device 47 then determines and calculates the at least one aberration of the test beam TB and determines at least one correction signal. The correction signal determined in this way is transmitted from the control device 47 to an interface 52. As is apparent from FIG. 5, a further modulation device 51 is provided and arranged after the test projection device 50 in the direction of light propagation. The interface 52, which receives the at least one correction signal, is provided between the modulation device 48 which is associated with the projection device 40 emitting the at least one signal beam, and the further modulation device 51 which is associated with the test projection device 50. By means of the further modulation device 51, it can be checked whether or not the determined at least one correction signal will compensate for the at least one caused aberration in the wavefront of the at least one signal beam to be emitted by the projection device 40. For this purpose, the at least one correction signal is transmitted from the interface to the further modulation device 51 and modulated with the test beam TB emitted by the test projection device 50. This modulated test beam TB is directed to the deflection device 43 and from there to the sensor device 46. The sensor device 46 again determines data of the incident test beam TB, and the control device 47 calculates from it a possible aberration which is still present and a further correction signal, should the sensor device 46 and the control device 47 detect and calculate a deviation from a required light beam. This check of the correction signal can be carried out until it corresponds to the required value. If the correction signal corresponds to the required correction signal, it is then transmitted by means of the control device 47 and the interface 52 to the modulation device 48, so that by means of said modulation device, at least one signal beam SB emitted by the projection device 40 is modulated with the correction signal and thus the wavefront of the signal beam SB is corrected correspondingly. The detection of the test beam TB, the determination of the at least one aberration, the determination of the at least one correction signal, and the compensation for the at least one aberration generally take place according to the procedure as described for FIG. 2a.

After the compensation for the at least one aberration by means of the modulation device 48, the at least one signal beam SB emitted by the projection device 40 is directed to the deflection device 43 and reflected by it to a visibility region V at which at least one eye of an observer 44 is positioned, and the generated information is represented in the field of view of the observer 44.

The further modulation device 51 is not necessarily required. After detection of the at least one test beam TB in the sensor device 46 and the determination of the at least one correction signal in the control device 47, the at least one correction signal can also be transmitted only to the modulation device 48. In this case, it is omitted to check whether the at least one correction signal compensates for sufficiently the at least one aberration. The head-up display device then has fewer components and may therefore be designed more cost-efficiently.

The provision of a test projection device 50 which is separate from the projection device 40, in order to emit only the at least one test beam, facilitates the different emission of the individual light beams. This means that by means of different angles of incidence of the test beam and the signal beam onto the deflection device, it can be possible in a simpler way to deflect these beams by means of the deflection device in different directions.

Additional exemplary embodiments of the head-up display device according to the present invention may be provided. These are to be explained and described below.

The head-up display devices according to FIGS. 2a, 3 to 5 provide at least one test beam and a sensor device in order to detect aberrations of the deflection device in the area of the windshield of a transportation means or the windshield itself. However, further measuring principles and sensors may be used, which, alternatively or in addition to the sensor device according to FIGS. 2a, 3 to 5, may be used in the head-up display device according to the present invention.

For example, temperature sensors may be used for the detection of at least one aberration. Temperature sensors generally measure the temperature of the deflection device, the mounting thereof, or other components which are connected thereto. The deformation of the deflection device can be thereby determined, and at least one aberration can be calculated, or said aberration can be retrieved from data sets in a value table. Mechanical sensors may also be used which detect mechanical tensions of the deflection device. By a calculation by means of a value table or by means of previously defined data sets, the control device determines the current value of the at least one aberration of the deflection device from the determined data.

Figure 2B:
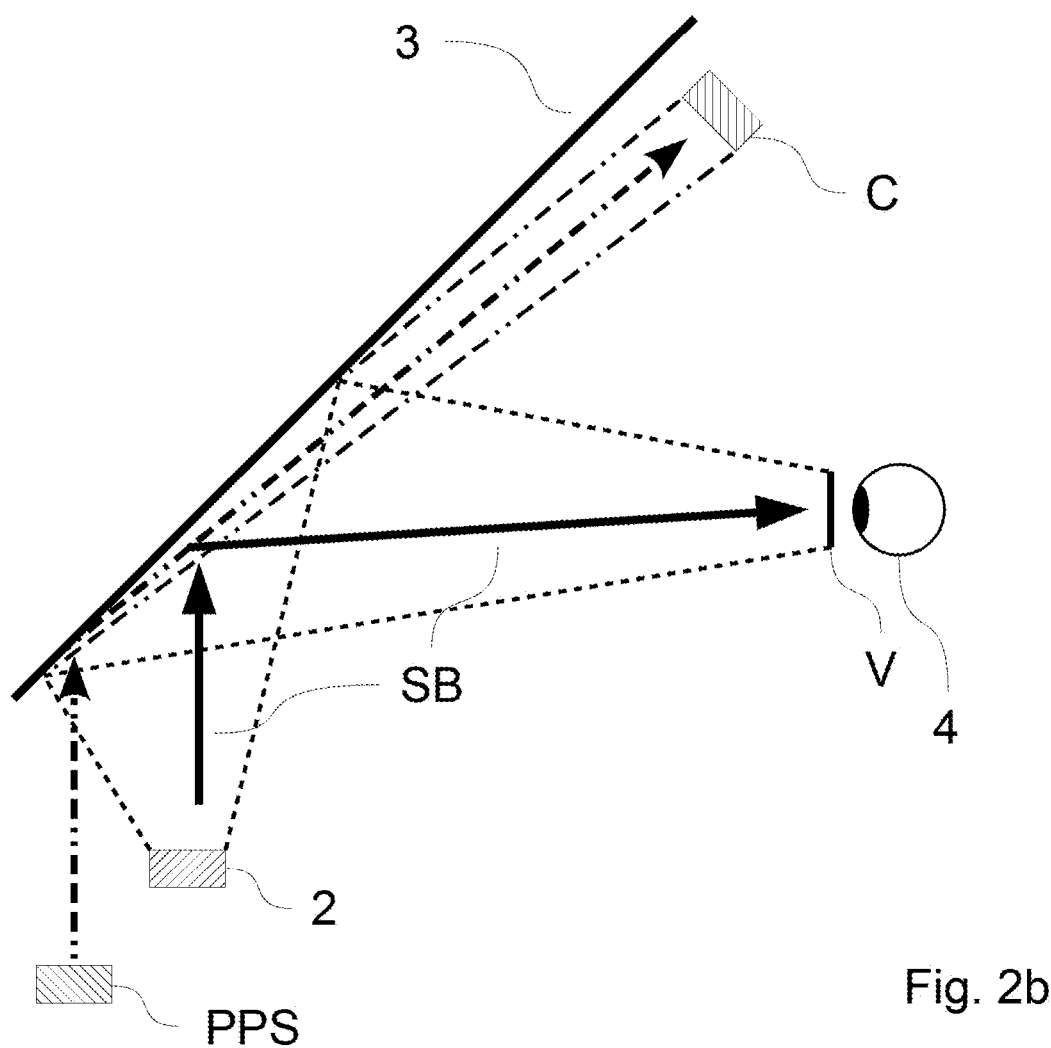
FIG. 2b: a schematic drawing of a head-up display device comprising a light pattern projection system according to the present invention.

Furthermore, a light pattern projection system could also be used as shown in FIG. 2b. This light pattern projection system PPS generates a light pattern on or in the area of the deflection device 3 in order thereby to determine at least one aberration. In this case, the light pattern could be projected in the form of stripes or a grid onto or in the area of the deflection device 3. A camera C records the shape of the light pattern, for example, the stripes or the grid, and from the deviation of the shape of the light pattern from the required form of the light pattern, at least one aberration of the deflection device 3 may be determined or calculated.

Figure 2C:
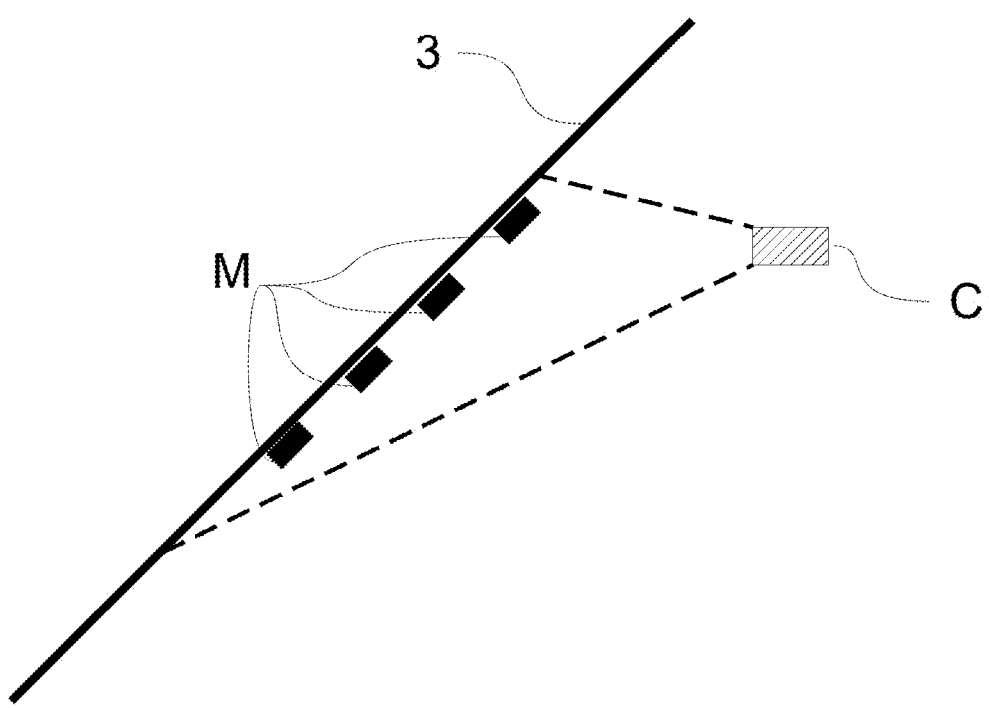
FIG. 2c: a schematic drawing of a section of a head-up display device using markers for the determination of aberrations.

Markers M may also be attached to the deflection device 3 in order to determine at least one aberration caused by the deflection device 3 as shown in FIG. 2c. The positions of the markers M on the deflection device 3 may be detected and measured by a camera system C. From the determined deviation of the positions of the markers M from the required positions of the markers M, at least one aberration of the deflection device 3 may be calculated.

At least one correction signal may then be determined respectively by means of the control device, regardless of whether the at least one aberration is determined by means of the sensor device according to FIGS. 2a to 5 and/or by means of temperature sensors and/or mechanical sensors and/or a light pattern projection system and/or by means of markers on the deflection device.

According to FIGS. 2a to 5, the at least one determined aberration is compensated for or corrected in a modulation device. Alternatively, or in addition to a modulation device, at least one aberration caused by the deflection device may be compensated for or corrected by means of the options described below.

For example, at least one aberration may also be compensated for in a hologram calculation if the head-up display device according to the present invention is designed as a holographic head-up display device and a hologram is encoded into the spatial light modulation device of the projection device. Thus, in addition or alternatively to the modulation device, the at least one aberration may be compensated for directly in the encoded hologram on the spatial light modulation device. For this purpose, the at least one aberration is kept available during the hologram calculation and compensated for in the projection device. Compensation for the at least one aberration may also take place in a holographic head-up display device by means of at least one modulation device, or in addition to the compensation, in the hologram calculation it may still take place by means of the at least one modulation device.

Furthermore, it is also possible to compensate for the at least one aberration directly in a two-dimensional image or a stereoscopic image.

In addition, the eye position of an observer may be taken into consideration when compensating for the at least one aberration. In this case, when compensating for the at least one aberration, the position of the eyes of the observer is taken into consideration, it being possible to detect said position by an eye position sensor system. The at least one aberration is then locally compensated for, for the current eye position. A better compensation for the at least one aberration may thereby be achieved than in the case of a global compensation without taking into consideration the eye positions.

In addition, a compensation for at least one aberration caused by the deflection device will affect an illumination beam path as well as an imaging beam path. In the illumination beam path, as a result, the position, the shape, and the size of the visibility region in an observer plane may also be optimized. In the imaging beam path, the image quality of the represented information could be optimized, for example, with respect to possibly occurring distortion and also with respect to the resolution of the represented information. This would primarily be relevant to a holographic head-up display device.

In addition, further combinations of the embodiments or exemplary embodiments are possible. Finally, it should be particularly especially noted that the exemplary embodiments described above are used only for describing the required teaching; however, this teaching is not to be limited to the exemplary embodiments.

For example, the at least one modulation device could be specially designed. The at least one modulation device could have ring-shaped or circularly arranged liquid cells in order in particular to correct rotationally symmetrical aberrations, such as the spherical aberration.

The invention claimed is:

1. A head-up display device for representing information in a field of view of an observer, comprising:
   at least one projection device,
   a deflection device comprising at least one deflection element at which incident light beams are deflected,
   a sensor device for detecting data of a least one test beam which is incident on the deflection device, and
   a control device for determining at least one aberration caused by the deflection device and for determining at least one correction signal in real time.

2. The head-up display device as claimed in claim 1, further comprising at least one modulation device, where the at least one modulation device is provided for the correction of signal beams which are directed in the direction of the observer with the at least one correction signal, in real time.

3. The head-up display device as claimed in claim 1, wherein the projection device is provided for the correction of signal beams with the at least one correction signal in real time, where in the case of a hologram calculation of a hologram provided for the projection device, the at least one correction signal is includable.

4. The head-up display device as claimed in claim 1, wherein the at least one deflection element of the deflection device is designed as a windshield.

5. The head-up display device as claimed in claim 1, wherein the at least one deflection element of the deflection device is designed to be at least one of wavelength-selective and angle-selective.

6. The head-up display device as claimed in claim 1, wherein the at least one deflection element is designed as a volume grating or as a volume grating attached to a substrate.

7. The head-up display device as claimed in claim 1, wherein the deflection device comprises at least two deflection elements.

8. The head-up display device as claimed in claim 7, wherein the at least two deflection elements are designed as volume gratings.

9. The head-up display device as claimed in claim 7, wherein one of the at least two deflection elements is designed as a volume grating, and the other of the at least two deflection elements is designed as a mirror element.

10. The head-up display device as claimed in claim 1, wherein the at least one deflection element is designed as a layer stack having dielectric layers.

11. The head-up display device as claimed in claim 1, wherein the projection device comprises an illumination device having at least one light source, at least one spatial light modulation device, and an optical system.

12. The head-up display device as claimed in claim 11, wherein a hologram is encoded into the spatial light modulation device.

13. The head-up display device as claimed in claim 1, wherein the projection device is provided for emitting signal beams and for emitting at least one test beam.

14. The head-up display device as claimed in claim 2, wherein the at least one modulation device is arranged in the beam path between the at least one projection device and the deflection device, where the at least one modulation device comprises at least one modulation element which modulates incident signal beams corresponding to the at least one determined correction signal.

15. The head-up display device as claimed in claim 2, wherein the at least one modulation device is controllable by means of the control device, which transmits the at least one correction signal to the modulation device.

16. The head-up display device as claimed in claim 2, wherein the at least one modulation device is designed as a phase modulator comprising liquid crystals, where the orientation of the liquid crystals is controllable by means of local electric fields.

17. The head-up display device as claimed in claim 16, wherein the liquid crystals are provided in cells, where the liquid crystal cells are arranged rotationally symmetrically in the at least one modulation device.

18. The head-up display device as claimed in claim 2, wherein the at least one modulation device is designed in a reflective fashion, preferably as a MEMS modulation device.

19. The head-up display device as claimed in claim 1, wherein the sensor device is arranged outside the field of view of the observer.

20. The head-up display device as claimed in claim 1, wherein the sensor device is designed according to the principle of a Shack-Hartmann sensor or as a camera for the detection of the at least one test beam.

21. The head-up display device as claimed in claim 1, wherein the sensor device is provided for measuring thermal and/or mechanical stresses of the deflection device.

22. The head-up display device as claimed in claim 1, further comprising a light pattern projection system for generating a light pattern on or in the area of the deflection device.

23. The head-up display device as claimed in claim 1, wherein markers are provided on the deflection device, the positions of which are determined by a camera.

24. The head-up display device as claimed in claim 1, wherein the at least one test beam has a wavelength which is different from that of the signal beams.

25. The head-up display device as claimed in claim 24, wherein the at least one test beam has a wavelength in the infrared wavelength range, and the signal beams respectively have a wavelength in the visible wavelength range.

26. The head-up display device as claimed in claim 1, further comprising a further projection device which is designed as a test projection device and which is provided for emitting the at least one test beam.

27. The head-up display device as claimed in claim 1, further comprising a further modulation device which is arranged in the beam path between the further projection device and the deflection device.

28. The head-up display device as claimed in claim 1, wherein a virtual visibility region is provided in an observer plane in which an eye of an observer is situated, by which the shown information is observable in the field of view.

29. The head-up display as claimed in claim 1, wherein the head-up display device is designed as a holographic head-up display device in which the information to be shown is holographically generated.

30. A method for representing information in a field of view of an observer, by at least one projection device, a deflection device, a sensor device, and a control device, comprising:
  detecting data of at least one test beam exiting the at least one projection device and being incident on the deflection device by means of the sensor device,
  determining at least one aberration caused by the deflection device by means of the control device, and determining at least one correction signal from it in real time, and
  modulating light beams to be directed in the direction of the observer with the at least one correction signal, then said light beams being are incident on the deflection device and are directed as signal beams in the direction of the observer.

31. The method as claimed in claim 30, wherein the correction signal is added to each signal beam emitted by the projection device by at least one modulation device, and the signal beam is modulated in real time corresponding to a required signal beam and directed to the observer by the deflection device.

32. The method as claimed in claim 30, wherein the eye position of the observer in the observer plane is detected by an eye position sensor system, where at least one aberration of the deflection device is determined by means of the control device, and at least one correction signal is determined from it in real time for the eye position of the observer.

* * * * *